(12) United States Patent
Riebel et al.

(10) Patent No.: US 8,765,827 B2
(45) Date of Patent: Jul. 1, 2014

(54) MULTIFUNCTIONAL BIOCOMPOSITE ADDITIVE COMPOSITIONS AND METHODS

(71) Applicant: GS Cleantech Corporation, New York, NY (US)

(72) Inventors: Michael J. Riebel, Mankato, MN (US); Jeffrey L. Tate, North Port, FL (US)

(73) Assignee: GS Cleantech Corporation, New York, NY (US)

( * ) Notice: Subject to any disclaimer, the term of this patent is extended or adjusted under 35 U.S.C. 154(b) by 4 days.

(21) Appl. No.: 13/863,758

(22) Filed: Apr. 16, 2013

(65) Prior Publication Data

US 2013/0303641 A1 Nov. 14, 2013

Related U.S. Application Data (60) Division of application No. 12/466,336, filed on May 14, 2009, now Pat. No. 8,449,986, and a continuation-in-part of application No. 12/398,984, filed on Mar. 5, 2009, now Pat. No. 7,937,850.

(60) Provisional application No. 61/053,196, filed on May 14, 2008, provisional application No. 61/068,191, filed on Mar. 5, 2008.

(51) Int. Cl.
| | |
|---|---|
| C08J 9/00 | (2006.01) |
| C08L 3/00 | (2006.01) |
| C08L 1/00 | (2006.01) |
| C08L 3/04 | (2006.01) |

(52) U.S. Cl.
USPC ............. 521/79; 521/84.1; 521/92; 524/35; 524/47

(58) Field of Classification Search
USPC ............ 521/79, 82, 84.1, 92; 525/35, 47, 368
See application file for complete search history.

(56) References Cited

U.S. PATENT DOCUMENTS

| | | | |
|---|---|---|---|
| 3,462,995 | A | 8/1969 | Weiss |
| 4,708,159 | A | 11/1987 | Lockwood, Jr. |
| 4,819,873 | A | 4/1989 | Lockwood, Jr. |
| 4,941,820 | A | 7/1990 | Lockwood, Jr. |
| 5,153,242 | A | 10/1992 | Timm et al. |
| 5,468,431 | A | 11/1995 | Helling |
| 5,593,625 | A | 1/1997 | Riebel et al. |
| 5,611,882 | A | 3/1997 | Riebel et al. |
| 5,635,123 | A | 6/1997 | Riebel et al. |
| 6,313,105 | B1 | 11/2001 | Bengs et al. |
| 6,323,265 | B1 | 11/2001 | Bengs et al. |
| 7,214,414 | B2 | 5/2007 | Khemani et al. |
| 7,256,223 | B2 | 8/2007 | Mohanty et al. |
| 7,332,119 | B2 | 2/2008 | Riebel |
| 7,601,858 | B2 | 10/2009 | Cantrell et al. |
| 7,937,850 | B2 | 5/2011 | Tate et al. |
| 8,256,134 | B2 | 9/2012 | Rehkopf et al. |
| 2002/0100565 | A1 | 8/2002 | Riebel et al. |
| 2005/0019545 | A1 | 1/2005 | Riebel |
| 2005/0075423 | A1 | 4/2005 | Riebel et al. |
| 2005/0101700 | A1 | 5/2005 | Riebel |
| 2005/0123744 | A1 | 6/2005 | Mohanty et al. |
| 2006/0036004 | A1 | 2/2006 | Wu et al. |
| 2006/0147582 | A1 | 7/2006 | Riebel |
| 2006/0155012 | A1 | 7/2006 | Riebel |
| 2007/0054106 | A1 | 3/2007 | Armstrong et al. |
| 2007/0106014 | A1 | 5/2007 | Kanenari et al. |
| 2007/0135536 | A1* | 6/2007 | Mohanty et al. ................ 524/47 |
| 2008/0029917 | A1 | 2/2008 | Maldas et al. |
| 2008/0125532 | A1 | 5/2008 | Nelson |
| 2009/0004712 | A1 | 1/2009 | Rehkopf et al. |
| 2009/0019720 | A1 | 1/2009 | Grobler et al. |
| 2009/0087452 | A1 | 4/2009 | Tate et al. |
| 2013/0253082 | A1 | 9/2013 | Riebel et al. |

FOREIGN PATENT DOCUMENTS

WO 2005100455 A1 10/2005

* cited by examiner

*Primary Examiner* — Kara Boyle
(74) *Attorney, Agent, or Firm* — Cantor Colburn LLP (57) ABSTRACT

Biocomposite compositions and compositions, which include dried distillers solubles, and which can be used in making biocomposite compositions are described. Methods for preparing the compositions are also described.

7 Claims, 2 Drawing Sheets

MULTIFUNCTIONAL BIOCOMPOSITE ADDITIVE COMPOSITIONS AND METHODS

CROSS REFERENCE TO RELATED APPLICATIONS

This application is a DIVISIONAL of U.S. patent application Ser. No. 12/466,336, filed May 14, 2009, which claims the benefit and priority of U.S. Provisional Application No. 61/053,196, filed on May 14, 2008 and entitled, BIOELASTOMERS DERIVED FROM CO-PRODUCTS OF BIO-FUEL PRODUCTION, the disclosure of which is incorporated herein by reference in its entirety. This application is also a continuation-in-part of U.S. application Ser. No. 12/398,984, filed on Mar. 5, 2009 and entitled, METHODS AND APPARATUS FOR DRYING CONDENSED DISTILLER'S SOLUBLES (CDS) TO PRODUCE DRIED DISTILLER'S SOLUBLES (DDS), which claims the benefit and priority of U.S. Provisional Application No. 61/068,191, filed on Mar. 5, 2008 and entitled, APPARATUS AND METHODS FOR THE PRODUCTION OF DRIED CDS, the disclosures of which are incorporated herein by reference in their entireties.

FIELD OF THE INVENTION

The present invention relates to biocomposite compositions and compositions that can be used in biocomposites. The present invention also includes methods of making the compositions.

BACKGROUND OF THE INVENTION

A variety of agents are used to form thermoplastic materials. These agents include compatibility agents, foaming agents as well as melt agents, which lower processing temperatures of plastics and other materials. Compatibility agents, melt agents and foaming agents can reduce the cost and consumption of thermoplastic or thermoactive materials. Accordingly, there remains a need for an inexpensive biologically derived material that can reduce the cost and consumption of plastic or thermoactive materials. There is also a need for inexpensive and energy efficient methods of producing biocomposite materials.

Recycled mixed plastics from domestic and commercial waste are generally incompatible in view of processing in a shaping process, such as extrusion. Mixtures of these plastics have led to materials that can be used in products having low physical and mechanical demands. Compatibility agents allow mixtures of incompatible plastics to be molded into generally uniform materials. Compatibility agents that have been used are generally chemical agents, such as polystyrol and polybutadiene. These and other chemical compatibility agents are generally toxic and expensive. Similarly, chemical melt agents are generally toxic and expensive. Hence, there is a need for compatibility and melt agents that are inexpensive as well as non-toxic.

Foaming agents are frequently used in the production of various polymeric foamed materials. The foaming agents are generally physical blowing agents such as nitrogen or carbon dioxide in a supercritical state and are injected into a molten polymer. The blowing agents produce microscopic cells throughout a polymer, which results in a foamed polymer. This process requires expensive equipment and materials. Thus there is a need for a foaming agent that is inexpensive and simple to use.

SUMMARY OF THE INVENTION

Methods, apparatus and compositions disclosed herein may resolve many of the needs and shortcomings discussed above and will provide additional improvements and advantages that may be recognized by those of ordinary skill in the art upon review of the present disclosure.

DDS biocomposite additive compositions are disclosed herein. In one aspect, the DDS biocomposite additive compositions comprise about 30 wt-% to about 90 wt-% dried distiller's solubles, about 5 wt-% to about 20 wt-% metal oxide; and about 5 wt-% to about 50 wt-% fiber. In some embodiments, the compositions further comprise about 1 wt-% to about 15 wt-% latex, acrylic latex or other latex compound.

Methods for producing a DDS biocomposite additive are also described herein. In one aspect the method comprises combining a mixture comprising about 30 to about 90 wt-% dried distiller's solubles, about 5 to about 20 wt-% metal oxide and about 5 to about 50 wt-% fiber; and drying the mixture in a pulsed drying gas stream using a pulse combustion dryer.

Biopolymer compositions are also disclosed herein. In one aspect the biopolymer comprises about 80 wt-% to about 99.5 wt-% of a thermoplastic, thermoset, resin, polymer adhesive material, or mixtures thereof, about 0.15 wt-% to about 10 wt-% of dried distiller's solubles, about 0.025 wt-% to about 4.0 wt-% of a metal oxide; and about 0.025 wt-% to about 10 wt-% fiber. In some embodiments, the biopolymer composition also includes about 0.005 wt-% to about 5 wt-% of latex, acrylic latex, or other latex compound.

Methods of using the DDS biocomposite additive for making foamed compositions are also disclosed herein. In addition, methods of using the DDS biocomposite additive for lowering the processing temperature of a thermoplastic material and for processing incompatible thermoplastic mixtures into homogeneous thermoplastic compositions are also described herein.

Other features and advantages of the compositions and methods disclosed herein will become apparent from the following detailed description and from the claims.

All Figures are illustrated for ease of explanation of the basic teachings of the present inventions only; the extensions of the Figures with respect to number, position, order, relationship and dimensions will be explained or will be within the skill of the art after the following description has been read and understood. Further, the apparatus, materials and other operational parameters to conform to specific size, dimension, force, weight, strength, velocity, temperatures, flow and similar requirements will likewise be within the skill of the art after the following description has been read and understood.

Where used to describe the drawings, the terms "top," "bottom," "right," "left," "forward," "rear," "first," "second,"

"inside," "outside," and similar terms may be used, the terms should be understood to reference the structure and methods described in the specification and illustrated in the drawings as they generally correspond to their with the apparatus and methods in accordance with the present inventions as will be recognized by those skilled in the art upon review of the present disclosure.

DETAILED DESCRIPTION OF THE INVENTION

A DDS biocomposite additive as a composition, including various components of the DDS biocomposite additive, as well as, methods for the producing the DDS biocomposite additive are described herein. In addition, biopolymer compositions that contain the DDS biocomposite additive, as well as methods of producing the biopolymer compositions are also described. Properties of the DDS biocomposite additive for use in producing biopolymer compositions are also described, including its use as a foaming agent, an agent for reducing thermoplastic processing temperatures and its use as a compatibilizing additive for incompatible thermoplastic mixtures.

The Figures generally illustrate various exemplary embodiments of the DDS production apparatus 10, compositions, and methods. The particular exemplary embodiments illustrated in the Figures have been chosen for ease of explanation and understanding. These illustrated embodiments are not meant to limit the scope of coverage, but, instead, to assist in understanding the context of the language used in this specification and in the claims. Accordingly, variations of the DDS production apparatus 10, compositions, and methods that differ from the illustrated embodiments may be encompassed by the appended claims.

DEFINITIONS

As used herein, condensed distiller's solubles (CDS) refers to the generally soluble portion of whole stillage (i.e. thin stillage) condensed by evaporation into a syrup.

As used herein, dried distiller's solubles (DDS) refers to the generally soluble portion of whole stillage in dried form.

As used herein, "glass transition point" or "Tg" refers to the temperature at which a particle of a material, such as a plastic or polymer reaches a "softening point" so that it has a viscoelastic nature and can be more readily compacted. Below Tg a material is in its "glass state" and has a form that can not be as readily deformed under simple pressure. As used herein, "melting point" or "Tm" refers to the temperature at which a material, such as a plastic or polymer melts and begins to flow. Suitable methods for measuring these temperatures include differential scanning calorimetry (DSC), dynamic mechanical thermal analysis (DTMA) and thermal mechanical analysis (TMA).

As used herein, weight percent (wt-%) percent by weight, % by weight and the like are synonyms that refer to the concentration of a substance as the weight of that substance divided by the weight of the composition and multiplied by 100. Unless otherwise specified, the quantity of an ingredient refers to the quantity of active ingredient.

As used herein, the term "about" modifying any amount refers to the variation in that amount encountered in real world conditions of producing materials, such as DDS additives, polymers or composite materials, e.g., in the laboratory, pilot plant or production facility. For example, an amount of an ingredient employed in a mixture when modified by "about" includes the variation and degree of care typically employed in measuring in a plant or laboratory producing a material or polymer. For example, the amount of a component of a product when modified by "about" includes the variation between batches in a plant or laboratory and the variation inherent in the analytical method. Whether or not modified by "about", the amounts include equivalents to those amounts. Any quantity stated herein and modified by "about" can also be employed in the present invention as the amount not modified by about.

A DDS biocomposite additive may comprise a number of materials, with the major material being DDS, or other material containing vegetable proteins. Other material containing vegetable proteins include, without limitation, soy protein isolate, corn gluten meal, forms of distiller's dried grains and residual amino acid/proteins from CDS processing. A number of methods are used to remove starch from the primary vegetable protein material. The material may be processed to a fine powder form ranging from particle size 30 mesh to well into the nanosize particle range.

Stillage may be fractionated into various stillage fractions including a settleable fraction and a suspended fraction. The settleable fraction includes non-dissolved settleable materials that generally settle out of the water component. In various aspects, the settleable fraction is known in the industry as Distiller's Wet Grains (DWG) in the moist form and Dried Distiller's Grains (DDG) in the substantially dried form. The suspended fraction includes the generally non-settleable materials that remain suspended, solubilized, and/or dissolved in the water component of the stillage. The suspended fraction, for example, may include dissolved materials, colloidal materials, and/or non-colloidal materials that are sufficiently fine and/or of low specific gravity that they generally remain in suspension.

Upon removal of the settleable fraction from the stillage, the remainder, which includes the suspended fraction is termed thin stillage. The thin stillage, which may include a large fraction of water, may be concentrated in, for example, an evaporator, which removes a portion of the water from the thin stillage to produce syrup. As used herein, the term Condensed Distiller's Solubles (CDS) encompasses the suspended fraction of stillage, and includes thin stillage and syrup derived from thin stillage. CDS may be generally liquid, syrup or other viscous fluid, or slurry, paste, or other non-Newtonian fluid, and the CDS may include various agglomerations, aggregations, non-homogeneities, and/or clumps of material. Dried Distiller's Solubles (DDS) as used herein includes CDS in a dried form—i.e., the suspended fraction in the dried form as well as various fractions and variants of the suspended fraction of stillage in the dried form, so that the components of DDS generally include the non-water components of CDS. DDS may be generally a powder, a granular material, or similar in various aspects.

In various aspects, the CDS may include components of the feedstock that pass through the process units of the ethanol production facility, and may also include waste yeast including yeast cells and/or portions of yeast cells wasted from the process units. The CDS, in various aspects, includes oils, proteins, amino acids, non-fermented sugars, unconverted starches, unconverted cellulose, and other materials that may be sensitive to heat and may oxidize, denature, or otherwise may be altered by heat. The CDS, in various aspects, may include fiber, and may include minerals such as phosphorous, sulfur, and calcium. The CDS may include, in various aspects, various additives such as buffers, acids, and/or bases for the adjustment/control of the pH and salts thereof, fillers, binding agents, and preservatives. The corresponding DDS would generally include the non-water portions of the CDS such as, for example, oils, proteins, amino acids, non-fermented sugars, unconverted starches, unconverted cellulose, minerals, salts, binding agents, and preservatives.

CDS may be obtained from an ethanol production facility configured to convert starch-based biomass feedstock into ethanol. Such CDS includes the generally suspended and/or solubilized non-fermentable components of the starch-based biomass feedstock. For example, the starch-based biomass may be grain such as corn. The grain includes starch as well as germ, fiber, and gluten. The germ, fiber, and gluten in the grain may be communicated through the process units of the ethanol production facility along with the starch as the starch is converted into fermentable sugar and the fermentable sugar is fermented into ethanol. Accordingly, the resulting CDS may generally include suspended and/or solubilized non-fermentable materials in the grain feedstock such as germ, fiber, and gluten, and may also include waste yeast, and may also include unfermented fermentable sugars and unconverted starch and oligosaccharides. The corresponding DDS would generally include corresponding materials in substantially dried form in various aspects.

In other aspects, the germ, fiber, and/or gluten in the grain may be removed by one or more process units prior to fermentation, and the resulting CDS may generally include the suspended and/or solubilized non-fermentable portions of the grain feedstock that remain following removal of the germ, fiber, and/or gluten, as well as waste yeast and starches that escaped conversion into sugar, and may also include unfermented fermentable materials such as unfermented sugar. The corresponding DDS would generally include corresponding materials in substantially dried form in various aspects.

In other aspects, CDS may be obtained from an ethanol production facility configured to convert cellulosic biomass feedstock into ethanol. Such CDS includes the generally suspended and/or solubilized non-fermentable components of the cellulosic biomass feedstock. The corresponding DDS would generally include the generally suspended and/or solubilized non-fermentable components of the cellulosic biomass feedstock in substantially dried form in various aspects and may include unconverted cellulose, various oligosaccharides, and/or unfermented fermentable components.

Condensed distiller's solubles contains from about 12% to up to 50% solids. In some embodiments, CDS contains about 30-40% solids. For exemplary purposes, CDS from High Plains Corporation was analyzed and the results are shown in Tables 1 and 2. Total nitrogen, ammonia, phosphorus, protein and amino acids were analyzed using standard methods. The content of major ethanol fermentation by-products, including lactate and acetate was also analyzed. The content of CDS can vary depending on the ethanol production process, grain used, including corn variety, growing season, and post processing methods.

TABLE 1

Characterization of Corn CDS

| | |
|---|---|
| Total Solids | 28.7% |
| Water | 71.3% |
| Total Nitrogen | 1.20% |
| Total Phosphorus | 0.31% |
| Crude Protein | 7.30% |
| Water soluable peptides and amino acids | 3.16% |
| Ammonia | 0.11% |
| Lactate | 2.40% |
| Acetate | 0.15% |

TABLE 2

Characterization of Corn CDS from DGRA

| | |
|---|---|
| Dry Matter | 33.4% |
| Crude Protein | 20.8% |
| Crude Fat | 22.2% |
| Crude Fiber | 2.8% |
| ADF | 2.3% |
| NDF | 4.3% |
| Ash | 9.2% |

In general, CDS produced from a corn ethanol facility contains a high percentage of fatty acids and oils from corn. The fatty acids are primarily linoleic and oleic acids as well as other forms of fatty acids.

CDS has a shelf life of days before autooxidation occurs, resulting in rancidity, which negatively affects the product. Accordingly CDS is often dried, using various methods, to produce dried distiller's solubles (DDS). Drying methods include processes using standard drying equipment, including, without limitation, evaporation, spray drying, vented extrusion, belt drying, and pulse combustion drying. Some methods and apparatus are described in U.S. patent application Ser. Nos. 12/215,214 and 12/398,984, which are incorporated herein by reference in their entireties. Drying CDS would generally preserve the solubles and suspended material in CDS and may allow for storage and/or distribution. The DDS can be in the form of particles, powder, pellets, agglomerates and other forms.

In other embodiments, other vegetable processed materials can also be used. By-products from other types of other alcohol processing can produce material similar to CDS produced from corn ethanol production. Other alcohol processing includes, without limitation, production of beer, wine, sake, spirits and other alcohol processing. Various cereal grains are used to produce alcohol products, including, without limitation, rice, wheat, rye, corn, barley and other agricultural inputs. In these applications, the cereal grains include various percentages of fatty acids, oils, proteins and amino acids that represent byproduct streams from these processes. In these cases, the proteins, amino acids, oils and fatty acids also have been subjected to fermentation.

Another form of fatty acid/amino acid-protein by-product is in the form of soapstock. Soapstock is a by-product of soybean oil processing, in which soybeans are crushed and oil fatty acids are removed by hexane extraction. The oils are refined and separated leaving a protein-amino acid/fatty acid mixture, similar to CDS. In some embodiments, additional oils, such as corn oil, used fryer waste oils, soybean oils, vegetable oils or other oils may be added to the mixture.

In other embodiments, co-products of biodiesel production may be used. By-products from the production of biodiesel from soybean oil and other oils and/or fatty acid materials include, without limitation, forms of glycerin, mixtures of fatty acids, oils proteins and/or amino acids and other materials.

DDS or CDS may be pretreated by chemical modification of proteins or amino acids in the material. CDS typically has a pH of about 4. Modifications can include, for example, treating proteins in CDS with an acid, base or other agent that alters the structure of one or more of the amino acid side chains, which, in turn, alters the character of the protein and/or amino acids. For example, the high glutamine and asparagine of prolamines, particularly zein from corn, provides a means for manipulating the charge characteristics of the protein by deamidation, thereby providing a wide range of hydrophobicity. In one embodiment, deamidation involves mild acid catalyzed deamidation at a pH of about 1 at temperatures from about 25° C. to about 65° C. for a period of time sufficient to accomplish the desired level of deamidation. In some embodiments, acids that form stable dispersions and are useful within these classes include, without limitation, lactic acid, citric acid, malonic acid, phosphoric acid, fumaric acid, maleic acid, maleic anhydride, maleated propylenes, glutaric acid, transaconitic acid, acetic acid, propionic acid, sorbic acid, cysteine and glycyl glycine. In one embodiment, lactic acid in the form of polylactic acid is used. In another embodiment, maleated propylenes, such as G-3003 and G-3015 manufactured by Eastman chemicals are used.

Other examples of chemical modification include, without limitation, esterification of proteins with fatty alcohols and acylation of proteins with fatty anhydrides.

Various materials may be added to DDS or CDS to form a DDS biocomposite additive or additive for use in biopolymer compositions. The materials include, without limitation, catalysts, fibers, cross-linkers, binders, proteins, natural biopolymers, minerals, impact modifiers, thermal stabilizers, lubricants, plasticizers, organic and inorganic pigments, biocides, processing aids, flame retardants, antioxidants, antistatic agents, delustering agents, coloring agents, aromatic agents, antiaging agents, fluorescent brightening agents, ultraviolet absorbers, ultraviolet stabilizers, slip additives, chain extenders, viscosity stabilizers, emulsifiers, and other materials.

Various catalysts can be added to DDS, including, without limitation, metallic catalysts and non-metallic catalysts. Metal catalysts include, without limitation, metal oxides, including, for example, zinc oxide, titanium dioxide, copper oxides, (cuprous oxide and/or cupric oxide), aluminum oxide, calcium oxide, stannous oxide, lead oxide and other metal oxides; and metals, for example, zinc, titanium, copper, iron, nickel, zirconium, and aluminum. Other catalysts include, without limitation, fly ash and Portland cement.

Some oxides also assist with odor reduction and increase the shelf life of DDS. Without being bound by theory, oxides, such as titanium dioxide, may reduce autooxidation of CDS and DDS.

Plasticizers can be included in the DDS biocomposite additive, or can be added to the thermoactive or thermoplastic material. Plasticizers can modify the performance of the biopolymer, for example, by making it more flexible and/or changing flow characteristics. The present biopolymer compositions can include plasticizer in amounts used in conventional plastics. Suitable plasticizers include natural or synthetic compounds such as at least one of polyethylene glycol, polypropylene glycol, polyethylene-propylene glycol, triethylene glycol, diethylene glycol, dipropylene glycol, propylene glycol, ethylene glycol, glycerol, glycerol monoacetate, diglycerol, glycerol diacetate or triacetate, 1,4-butanediol, diacetin sorbitol, sorbitan, mannitol, maltitol, polyvinyl alcohol, sodium cellulose glycolate, urea, cellulose methyl ether, sodium alginate, oleic acid, lactic acid, citric acid, sodium diethylsuccinate, triethyl citrate, sodium diethylsuccinate, 1,2,6-hexanetriol, triethanolamine, polyethylene glycol fatty acid esters, oils, epoxified oils, natural rubbers, other known plasticizers, mixtures or combinations thereof, and the like. Citrate esters, such as trimethyl citrate, triethyl citrate, tributyl citrate, trioctyl citrate, acetyltri-n-butyl citrate, acetyltriethyl citrate, acetyltri-n-hexylcitrate, butyryltri-n-hexyl citrate and the like may also be used as plasticizers. In certain embodiments, the present DDS biocomposite additive and/or the biopolymer or can optionally include about 0.001 to about 15 wt-% plasticizer, about 0.001 to about 30 wt-% plasticizer, or about 0.001 to about 50 wt-% plasticizer.

Cross linking agents have been found to decrease the creep observed with plastic composite products and/or can modify water resistance. Crosslinking agents also have the ability to increase the mechanical and physical performance of the present biopolymer. As used herein, crosslinking refers to linking the thermoactive material or plastic(s) and DDS or vegetable protein material. Crosslinking can be distinguished from coupling agents which form bonds between plastic materials. Suitable crosslinking agents include one or more of metallic salts (e.g., NaCl or rock salt) and salt hydrates (which may improve mechanical properties), urea, formaldehyde, urea formaldehyde, ethylene vinyl acetate, (EVA), polyesters, phenol and phenolic resins, melamine, methyl diisocyanide (MDI), epoxides, other adhesive or resin systems, mixtures of combinations thereof, and the like. In an embodiment, the present biopolymer and/or DDS biocomposite additive can optionally include about 0.001 to about 20 wt-% crosslinking agent. The same or similar agents may also serve as binders.

In some embodiments, the additive or biopolymer includes a lubricant. A lubricant can alter the fluxing or melting point in a compounding, extrusion or injecting molding process to achieve desired processing characteristics and physical properties.

Lubricants can be categorized as external, internal, and external/internal. These categories are based on the effect of the lubricant on the melt in a plasticizing screw or thermal kinetic compounding device as follows. External lubricants can provide good release from metal surfaces and lubricate between individual particles or surface of the particles and a metal part of the processing equipment. Internal lubricants can provide lubrication within the composition, for example, between resin particles, and can reduce the melt viscosity. Internal/external lubricants can provide both external and internal lubrication.

Suitable external lubricants include non-polar molecules or alkanes, such as at least one of paraffin wax, mineral oil, polyethylene, mixtures or combinations thereof, and the like. Such lubricants can help the present biopolymer (for example, those including PVC) slip over the hot melt surfaces of dies, barrel, and screws without sticking and contribute to the gloss on the end product surface. In addition an external lubricant can maintain the shear point and reduce overheating of the biopolymer.

Suitable internal lubricants include polar molecules, such as at least one of fatty acids, fatty acid esters, metal esters of fatty acids, mixtures or combinations thereof, and the like. Internal lubricants can be compatible with thermoactive materials or plastics such as olefins, polyvinyl chloride (PVC), and other thermally active materials and DDS or vegetable protein material. These lubricants can lower melt viscosity, reduce internal friction and related heat due to internal friction, and promote fusion.

Certain lubricants can also be natural plasticizers. Suitable natural plasticizer lubricants include at least one of oleic acid, linoleic acid, polyethylene glycol, glycerol, stearic acid, palmitic acid, lactic acid, sorbitol, wax, epoxified oil (e.g., soybean), heat embodied oil, mixtures or combinations thereof, and the like.

Other lubricants include soapstock and other forms of byproduct fatty acids and/or oils. These include, without limitation, congealed vegetable oils, and other fatty acids or oils. The ability to use low value byproducts from these agricultural processes creates a new value for these materials and supplies a solution to hazardous materials, thus creating a sustainable solution. In some embodiments, the present DDS biocomposite additive and/or biopolymer can optionally include about 0.01 to about 10 wt-% lubricant.

The additive and/or biopolymer, in some embodiments, may include a processing aid. Suitable processing aids include acrylic polymers and alpha methylstyrene. These processing aids can be used with a PVC polymer. A processing aid can reduce or increase melt viscosity and reduce uneven die flow. In a thermoactive and/or plastic material, it promotes fluxing and acts like an internal lubricant. Increasing levels of processing aids normally allow lower compounding, extrusion, injection molding processing temperatures. In some embodiments, the biopolymer or DDS biocomposite additive can optionally include about 0.1 to about 10 wt-% processing aid.

The additive and/or biopolymer may include an impact agent. Certain applications require higher impact strength than a simple plastic. Suitable impact modifiers include acrylic, acrylonitrile-butadiene (ABS), acrylic copolymer, chlorinated polyethylene (CPE), methacryalate-butadiene-styrene (MBS), ethylene vinyl acetate (EVA), mixtures thereof, and the like. These impact modifiers can be used with a polyvinyl chloride (PVC) thermoactive material. In an embodiment, the present additive and/or biopolymer can optionally include about 0.1 to about 10 wt-% impact modifier.

Fire retardants may also be added to the DDS biocomposite additive and/or the biopolymer. Suitable fire retardants include, without limitation, alumina trihydrate and magnesium hydroxide, which in some embodiments, are in the form of particles of about 40 microns in diameter or less. Phosphorous compounds, borates and zinc oxide may also be used as fire retardants. In an embodiment, the present additive and/or biopolymer can optionally include about 0.001 to about 10 wt-% fire retardant.

The present additives and/or biopolymers can include a fiber additive. Suitable fibers include any of a variety of natural and synthetic fibers. Cellulose fibers include, without limitation, those from wood, agricultural fibers, including flax, hemp, kenaf, wheat, soybean, switchgrass, and grass, fibers obtained from paper and other fiber recycling, including, without limitation, household and industrial paper recycling streams, fibrous waste from the paper or wood industries, including paper mill sludge. Synthetic fibers include fiberglass, Kevlar, carbon fiber, nylon; mixtures or combinations thereof, and the like. Mineral or silica additives may also be used. The fiber can modify the performance of the biopolymers. For example, longer fibers can be added to biopolymers structural members to impart higher flexural and rupture modulus. In some embodiments, the DDS biocomposite additive or biopolymer can include about 0.001% to about 40% fiber.

Fillers may also be included in the DDS biocomposite additive and/or the biopolymer. Examples of fillers include, without limitation, calcium carbonate, magnesium carbonate, calcium hydroxide, calcium oxide, magnesium oxide, aluminum oxide, silicon oxide, iron oxide, boron nitride, titanium oxide, talc, pyrophyllite clay, silicate pigment, polishing powder, mica, sericite, bentonite, pearlite, zeolite, wollastonite, fluorite, dolomite, quick lime, slaked lime, kaolin, chlorite and diatomaceous earth.

Nanomaterials may also be used as fillers, including Nano-Cell (LDI Composites), which is a blend of cellulose, minerals and clay that has been processed into a submicron material. It is derived from paper mill sludge. NanoCell also contains small percentages of metals and titanium dioxide. Other forms of nanomaterials, such as nanofibers, nanotubes, nanocellulosics, nanoclays and other forms of nanomaterials may also be included in the DDS biocomposite additive and/or the biopolymer.

Other materials that can be included in the present DDS biocomposite additive and/or biopolymers can include components found in latex paint, including, without limitation, latex compounds, including, without limitation, acrylic latexes such as styrenated acrylic latex; calcium carbonate, colorants, dispersants, such as, for example, napthalene sulfonic acid condensation products; ammonium hydroxide; surfactants; glycol ethers, including (propylene glycol) methyl ether; 2,2,4-trimethylpentanediol-1,3-monoisobutyrate; sodium nitrite; ethylene glycols, such as triethylene glycol bis(2-ethylhexanoate); drying agents, such as metal oxides, including, without limitation, zirconium oxides, cobalt oxides and iron oxides, as well as ethylene oxides and ethylene oxide derivatives and condensates, including, without limitation, fatty alcohol ethoxylate, alkylphenol ethoxylate, fatty acid ethoxylate, ethoxylated fatty amines, and the like; preservatives, emulsifiers and thickeners.

The DDS biocomposite additive may include DDS at about 30 to about 90 wt-%.

The DDS biocomposite additive may be prepared by any of a variety of methods that can mix CDS or DDS with the other components. The methods include compounding, which refers to putting together parts so as to form a whole, and/or forming by combining parts. Compounding methods generally include wet compounding or dry compounding.

For wet compounding, condensed distiller's solubles (CDS) or dried distiller's solubles is mixed with the other components, at least one of which is in a solution. The solution may be generally liquid, syrup or other viscous fluid, or slurry, paste, or other non-Newtonian fluid, and the CDS may include various agglomerations, aggregations, non-homogeneities, and/or clumps of material.

In some embodiments, the wet DDS biocomposite additive is dried. Drying methods include methods using standard drying equipment, including, without limitation, evaporation, spray drying, vented extrusion, belt drying, and pulse combustion drying.

In some aspects, the wet compounded biocomposite additive is dried in a drying gas stream. Some methods and apparatus for drying the wet compounded biocomposite additive are described in U.S. patent application Ser. Nos. 12/215,214 and 12/398,984, which are incorporated herein by reference in their entireties.

Figure 1:
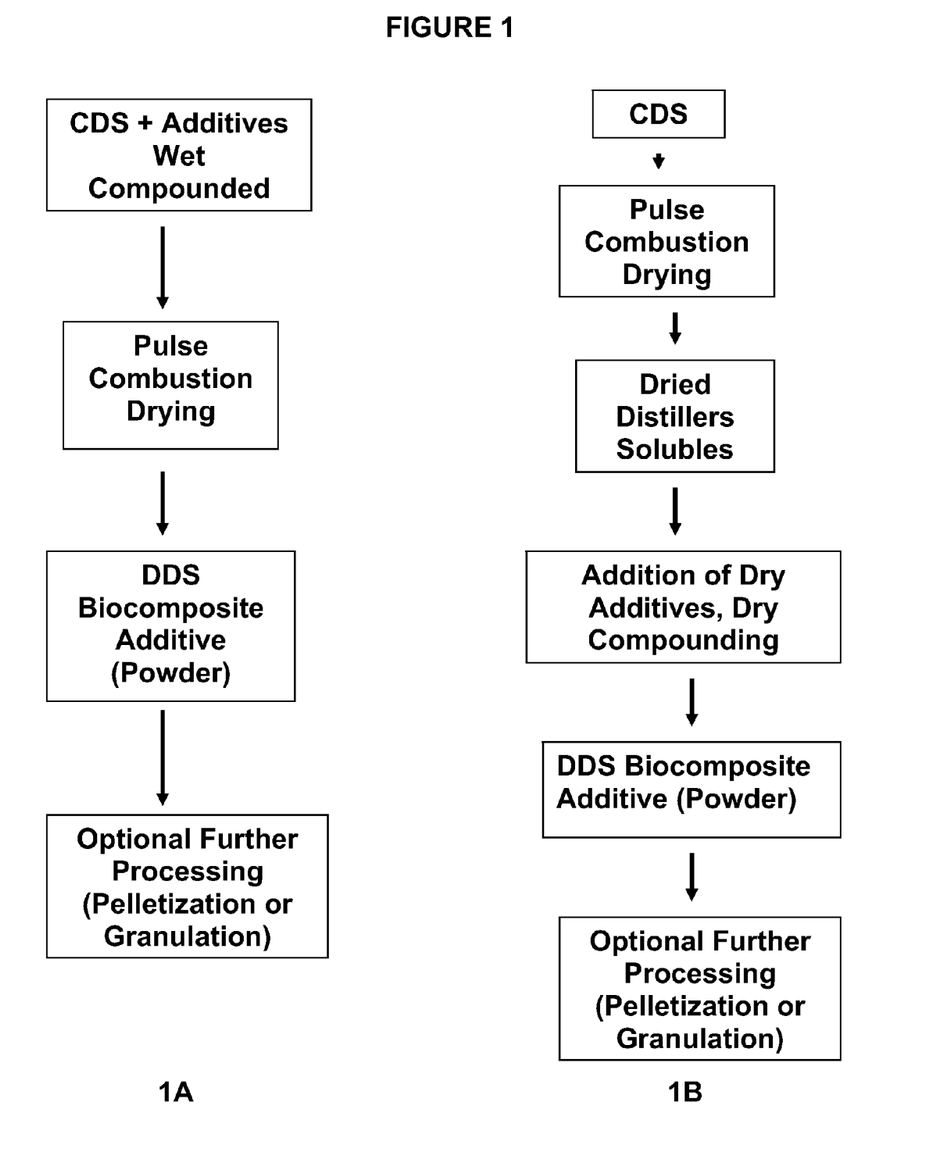
FIGS. 1A and 1B illustrate by a flow chart specific embodiments of the preparation of the dried distiller's solubles biocomposite additive.
Figure 2A:
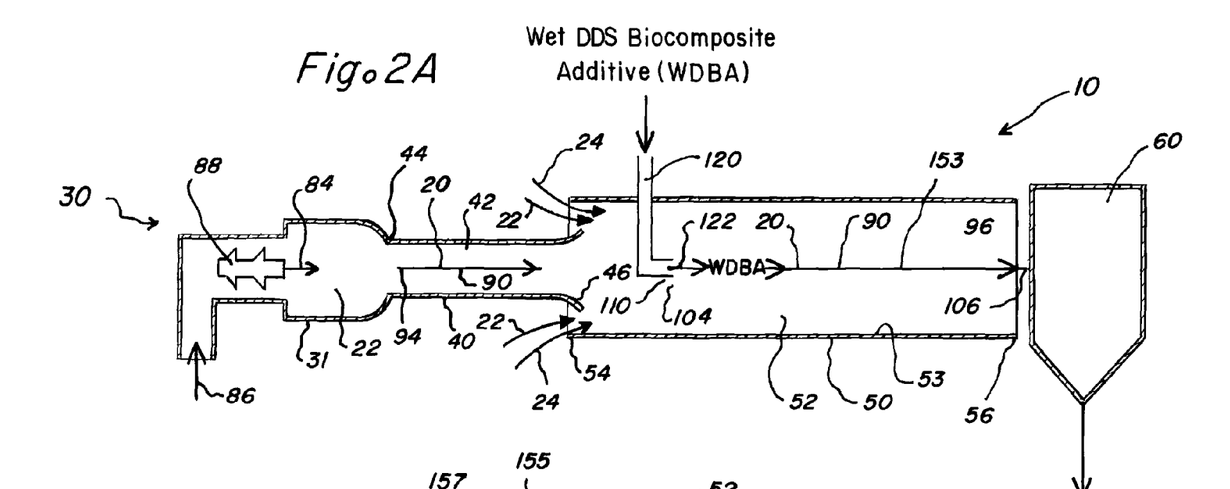
FIG. 2A illustrates by schematic diagram an embodiment of the pulse combustion dryer according to aspects of the present inventions.

In some aspects the wet compounded biocomposite additive is dried in a drying gas stream, and a particular embodiment of a pulse combustion drier 30 is generally illustrated in FIG. 2A. The drying gas stream 20 may consist generally of air and combustion products produced by the combustion of various solid, liquid, or gaseous fuels or combinations thereof. Examples of fuels would include propane, natural gas, and kerosene. In other aspects, the drying gas stream 20 may consist of heated air or other gas propelled by the release of compression. In various aspects, the drying gas stream 20 may include other gases or combinations of gases, which may be heated in various ways and configured to form the flowing drying gas stream 20, as would be recognized by those of ordinary skill in the art upon review of this disclosure.

In some aspects, the drying gas stream 20 may be characterized by a generally continuous flow. In other aspects, the drying gas stream 20 may be pulsed, and the pulses may have a frequency that may range from about 30 Hz to about 1,000 Hz. In various aspects, the drying gas stream 20 may include regions of high velocity flow, turbulence, and may include supersonic flows and shock waves. Pressures in the drying gas stream 20 may be about 2×104 Pa (gage) or more in various aspects. Sound pressures in the drying gas stream 20 may fall in the range of about 100 dB to about 200 dB in various aspects. In various aspects, a swirl component may be induced into the flow of the drying gas stream 20.

The flowing drying gas stream 20 defines a flow path 90 having a first end 94 and a second end 96 with the drying gas stream 20 flowing generally from the first end 94 to the second end 96. The first end 94 of the flow path 90 may be generally coincident with the location at which the drying gas stream 20 is generated. The second end 96 of the flow path 90 may be generally coincident with the region from which the DDS biocomposite additive is recovered from the drying gas stream 20 and may be defined by various structures configured to recover the DDS biocomposite additive. The wet compounded biocomposite additive may be introduced into the flowing drying gas stream 20 at an introduction location 110, with the introduction location 110 disposed along the flow path 90 generally between the first end 94 and the second end 96.

One or more passages 120, which may be defined by tubes, channels, pipes, or other structures, with each passage 120 having one or more passage outlets 122 adapted for the introduction of the wet compounded biocomposite additive into the drying gas stream 20 may be located in the flow path 90 between the first end 94 and the second end 96, and the location of the passage(s) 120 in the flow path 90 defines the introduction location(s) 110. The wet compounded biocomposite additive may be introduced into the drying gas stream 20 at the introduction location(s) 110 through the passage(s) 120. Pumps, piping, valves, and other such structures may be provided in various aspects to convey the wet compounded biocomposite additive to the passage(s) 120 for introduction into the drying gas stream 20 at the introduction location(s) 110 as would be recognized by those of ordinary skill in the art upon review of this disclosure.

The temperature of the drying gas stream 20 may be 2,300° F. or more generally proximate the first end 94 of the drying gas stream 20, which may be excessive for drying the wet compounded biocomposite additive. Accordingly, the temperature of the drying gas stream 20 may be controlled, in various aspects, to provide a first temperature 104 generally proximate the introduction location 110 and/or a second temperature 106 generally proximate the second end 96 of the flow path 90. The temperature of the drying gas stream 20 may be controlled in various aspects to control the first temperature 104 of the drying gas stream 20 generally proximate the first end 94 of the flow path 90 where the wet DDS biocomposite additive may be introduced into the drying gas stream 20. The temperature of the drying gas stream 20 may be controlled in various aspects to control the second temperature 106 of the drying gas stream 20 generally proximate the second end 96 of the flow path 90 where the DDS biocomposite additive may be recovered from the drying gas stream 20.

For example, one or more gas flows may be combined with the drying gas stream 20 as the drying gas stream 20 flows along the flow path 90 to control, at least in part, the first temperature 104 of the drying gas stream 20 at introduction location 110. The one or more gas flows combined with the drying gas stream 20 may control, at least in part, the temperature at the second end 96 of the flow path 90. The one or more gas flows combined with the drying gas stream 20 may control, at least in part, the temperature variation between the first temperature 104 and the second temperature 106. In various aspects, one or more gas flows may be combined with the drying gas stream 20 to provide for the uptake of water vapor and/or for other purposes as would be recognized by those of ordinary skill in the art upon review of this disclosure. In various aspects, conditions at the first end 94 of the flow path 90 may be adjusted in order to achieve a specific first temperature 104 and/or specific second temperature 106.

The first temperature 104 and/or the second temperature 106 may be chosen depending upon the nature of the wet compounded biocomposite additive to be introduced into the drying gas stream 20 in order to be dried into the DDS biocomposite additive. First and second temperatures 104, 106 may be selected so that volatile organic content (VOC), which may contain valuable components, are not vaporized by high temperatures. For example, in various aspects, the first temperature 104 may range from about 600° F. to about 2100° F. and the second temperature 106 may range from about 130° F. to about 200° F. In one embodiment, the first temperature 104 may be about 1,000° F. while the second temperature 106 may be about 150° F. In other aspects, the first temperature 104 may be about 600° F. to about 1200° F. and the second temperature 106 may be about 130° F. to about 200° F. In another embodiment, the first temperature 104 may be about 1800° F. and the second temperature 106 may be about 150° F. In yet another embodiment, the first temperature 104 may be about 1200° F. and the second temperature 106 may be about 140° F.

The highly turbulent drying environment, due the high velocity of drying gas stream 20, atomizes a viscous input, such as the wet compounded biocomposite additive, into smaller particles so that particles are dispersed. The high temperature gas stream 20 quickly evaporates the water from the small particles. The highly turbulent environment allows rapid mixing and communication between the hot drying gas stream 20 and the atomized particles. The difference between the first and second temperatures 104, 106 of gas stream 20, $\Delta T$, may be as large as 2000° F. In some aspects, $\Delta T$ ranges from 400° F. to about 1700° F. In some embodiments, $\Delta T$ is about 1650° F. Large $\Delta T$ allow for flash drying, in fractions of seconds to milliseconds or less, so that the temperature of drying particles is never higher than approximately the second temperature 106. In some embodiments, drying of particles occurs in $1/1000$ to 1 second, including, without limitation, $1/1000$, $1/100$, $1/10$, $1/5$, $1/4$, $1/3$, $1/2$, $2/3$, $3/4$ seconds, or 1 second.

In some aspects, atomizing air, including, without limitation, gas dynamic atomizing is used to atomize the wet DDS biocomposite additive. In some embodiments, no spray nozzle is used. Using atomizing air to disperse the wet DDS biocomposite additive into droplets, has a number of advantages over other drying methods, including spray drying. In general, spray dryers use either rotating disks or high pressure nozzles, which result in high shear forces. In contrast, gas or air atomization results in low or no shear forces. Pressures upstream of an atomizing venturi range from two to six psi above atmospheric pressure (14.7 psi). In addition, the hot air in conventional spray dryers is very slow moving, and much less turbulent than pulse combustion drying hot air. Accordingly, atomizing air at a very high first temperature, in concert with a low second temperature, (i.e., high $\Delta T$) results in extreme turbulence when a high velocity gas stream, which may be near sonic velocity, is introduced into the drying chamber. This allows for very rapid drying. Spray drying methods generally use much lower $\Delta T$, and much lower gas velocity, resulting in little or no turbulence and much longer drying times. Longer drying times require much larger drying chambers for spray drying, which increase capital costs dramatically.

The wet compounded biocomposite additive may be introduced into the drying gas stream 20 at the introduction loca- 
tion 110 to be exposed to the temperature of the drying gas stream 20 while being conveyed by the drying gas stream 20 from the introduction location 110 to the second end 96 of the flow path 90. The wet DDS biocomposite additive may be exposed to the temperature of the drying gas stream 20 for an exposure time that may be on the order of fractions of a second, and, in some aspects, on the order of a millisecond or less. The temperature of the drying gas stream 20 may cause water associated with the wet DDS biocomposite additive to flash into the vapor phase, while the latent heat of vaporization of the water in combination with the exposure time may keep the wet DDS biocomposite additive generally cool thereby protecting the wet DDS biocomposite additive from the temperature of drying gas stream 20. Turbulence, high velocities, and/or shock waves in the drying gas stream 20 may strip water from the wet DDS biocomposite additive and may otherwise increase the rate of evaporation of water from the wet DDS biocomposite additive by various mechanisms. The latent heat of evaporation of the water may also cool the drying gas stream 20, at least in part, from the first temperature 104 to the second temperature 106, so that the water content of the wet DDS biocomposite additive may, in some aspects, control the second temperature 106 and may control the temperature variation between the first temperature 104 and the second temperature 106, at least in part. The rate at which wet DDS biocomposite additive is fed into the drying gas stream 20 may control the first temperature 104, may control the second temperature 106, and may control the form of the temperature gradient between the first temperature 104 and the second temperature 106.

In some aspects, the gas stream 20 has a maximum velocity of between about 12,000 feet/minute (fpm) and about 50,410 fpm, (which translates to velocities between about 61 meters/sec and 256 meters/sec), and in some embodiments maximum velocities are between about 24,000 fpm and about 30,000 fpm (which translates to velocities between about 122 meters/second and 153 meters/second), but may range upward into supersonic velocities (67,000 fpm, or 343 meters/sec). When the flow is pulsed the gas stream 20 may oscillate between a lower value and the maximum velocity as will be recognized by those skilled in the art. When the gas stream is continuous, the maximum velocity will be maintained within a range or at a desired velocity within these ranges.

The high velocities result in extreme turbulence, which produces high heat transfer rates, leading to higher efficiency drying.

The evaporative rate may range from about 300 to about 600 pounds of water per hour in a dryer with a heat release of 1 million BTU per hour. The thermal efficiency may range from about 1200 to about 1800 BTU per pound of water removed. In some embodiments the thermal efficiency may be about 1200 BTU per pound of water removed; in other embodiments, the thermal efficiency may be about 1300, 1400, 1500, 1600, 1700 or 1800 BTU per pound of water removed.

In some aspects, drying the wet compounded biocomposite additive to the DDS biocomposite additive may be a continuous process. In some embodiments using a large dryer, water from the wet DDS biocomposite additive may be evaporated at a rate of about 10,000 pounds per hour to about 50,000 pounds per hour.

A collector 60 may be positioned about the second end 96 of the flow path 90 to recover the DDS biocomposite additive from the drying gas stream 20, and the collector 60 may generally define the second end 96 of the flow path 90. The collector 60 may be a cyclone, baghouse, screen or series of screens, filter(s), or similar, or combinations thereof configured to capture the DDS biocomposite additive from the drying gas stream 20 as would be recognized by those of ordinary skill in the art upon review of this disclosure. The collector 60 may be configured to cooperate with various material handling and storage mechanisms for the manipulation and/or storage of DDS biocomposite additive, as would be recognized by those of ordinary skill in the art upon review of this disclosure.

In some aspects, the drying gas stream 20 may be generated by a pulse combustion dryer 30. Examples of pulse combustion dryers 30 are described in U.S. Pat. Nos. 3,462,995, 4,708,159, 4,819,873, and 4,941,820 to Lockwood, the disclosures of which are incorporated herein by reference in their entireties. The pulse combustion dryer 30 may include a combustor 31 that defines a combustion chamber 32, and a tailpipe 40 that defines a tailpipe passage 42 having a first tailpipe passage end 44 and a second tailpipe passage end 46. The tailpipe passage 42 is in fluid communication with the combustion chamber 32 through the first tailpipe passage end 44.

The pulse combustion dryer 30, in some aspects, may include a drying chamber 50 that defines a drying chamber passage 52 having a first drying chamber passage end 54, a second drying chamber passage end 56, and centerline 153. The first drying chamber passage end 54 of the drying chamber 50 may be disposed with respect to the second tailpipe passage end 46 of the tailpipe 40 so that the drying chamber passage 52 is in fluid communication with the tailpipe passage 42, and, thence, in fluid communication with the combustion chamber 32. The combustor 31, tailpipe 40, and drying chamber 50 may be disposed with respect to one another in a variety of ways and may assume a variety of orientations with respect to the vertical that would be readily recognized by those of ordinary skill in the art upon review of this disclosure.

Combustion air 86 and fuel 84 may be admitted into the combustion chamber 32, and the resulting fuel-air mixture ignited periodically to provide the drying gas stream 20 in the form of a series of pulses of air mixed with heated combustion products. Combustion of the fuel-air mixture may be generally complete so that the heated combustion products would consist largely of carbon dioxide and water vapor. The drying gas stream 20 may flow from the combustion chamber 32, thru the tailpipe passage 42 from the first tailpipe passage end 44 to the second tailpipe passage end 46. In aspects that include the drying chamber 50, the drying gas stream 20 may be communicated from the tailpipe passage 42 into the drying chamber passage 52 generally proximate the first drying chamber passage end 54, and the drying gas stream 20 may flow through the drying chamber passage 52 generally from the first drying chamber passage end 54 to the second drying chamber passage end 56. Thus, the flow path 90 of the drying gas stream 20 includes the combustion chamber 32, the tailpipe passage 42, and, in aspects that include the drying chamber 50, the flow path 90 also generally includes the drying chamber passage 52. The first end 94 of the flow path 90 may be generally coincident with the combustion chamber 32.

In aspects wherein the drying gas stream 20 is generated by the pulse combustion dryer 30, the collector 60 may be disposed generally proximate the tailpipe passage second end 96 or, in aspects that include the drying chamber 50, generally proximate the second drying chamber passage end 56 to recover the DDS biocomposite additive. As would be understood by those of ordinary skill in the art upon review of this disclosure, the collector 60 may be disposed in other ways with respect to the drying chamber 50 to recover the DDS biocomposite additive from the second end 96 of the flow path 90 of the drying gas stream 20.

Figure 2B:
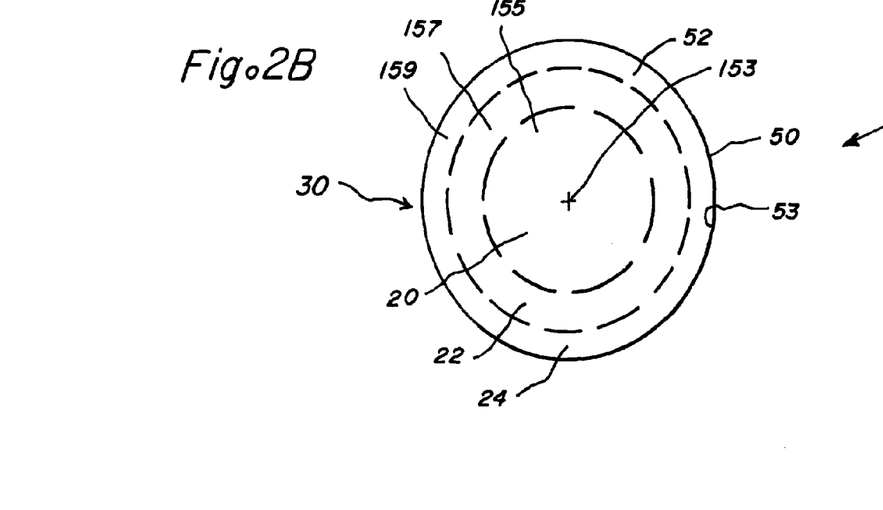
FIG. 2B illustrates by schematic diagram a cross-section of an embodiment of the drying chamber according to aspects of the present inventions.

The wet compounded biocomposite additive may be introduced into the drying gas stream 20 at the introduction location 
drying chamber passage 52 generally proximate the first drying chamber passage end 54 to provide thermodynamic space for the uptake of water evaporated from the wet compounded biocomposite additive in order to prevent water condensation and/or saturation conditions in the drying chamber passage 52 and/or in the collector 60. The quantity of dilution air 24 admitted into the drying chamber passage 52 may be regulated in various embodiments.

As illustrated in FIG. 2A, the drying gas stream 20 may pass through a core region 155 generally proximate the centerline 153 of the drying chamber passage 52. The dilution air 24 may pass through the wall region 159 of the drying chamber passage 52, which is the portion of the drying chamber passage 52 generally proximate the inner wall 53 of the drying chamber 50. The quench air 22 may pass through an intermediate region 157, which is intermediate between the wall region 159 and the core region 155.

The wet compounded biocomposite additive may be introduced into the drying gas stream 20 passing though the core region 155. The quench air 22 and/or the dilution air 24 may prevent or at least diminish contact between the wet DDS biocomposite additive/DDS biocomposite additive and the inner wall 53 of the drying chamber 50 as the wet compounded biocomposite additive/DDS biocomposite additive is carried through the drying chamber passage 42 by the drying gas stream 20 in order to generally reduce or eliminate deposition of the DDS biocomposite additive onto the inner wall 53.

FIG. 2B illustrates a cross-section of the embodiment of the drying chamber 50 generally illustrated in FIG. 2A. As illustrated in FIG. 2B, the drying chamber 50 defines a drying chamber passage 52 having a substantially circular cross-section. In this embodiment, the flows of the drying gas stream 20, the quench air 22, and the dilution air 24 through the drying chamber passage 52 generally define three regions within the drying chamber passage. These three regions include the core region 155 generally proximate the centerline 153 through which the drying gas stream 20 generally passes, the intermediate region 155 through which the quench air 22 generally passes, and the wall region 159 through which the dilution air 24 generally passes. The pulse combustion dryer 30 may be configured to regulate the amount of quench air 22 and/or the amount of dilution air 24 admitted into the drying chamber passage 52 in order to regulate temperature and other conditions within the drying chamber passage 52. In other embodiments, one or more airstreams could be introduced into the drying chamber passage 52 at various locations about the drying chamber passage 52 to cool the drying gas stream 20, provide thermodynamic space for evaporation, or for other purposes as would be understood by those of ordinary skill in the art upon review of this disclosure.

The drying gas stream 20 has a first temperature 104 generally proximate the introduction location 110, as illustrated in FIG. 2A. The drying gas stream 20 has a second temperature 106 generally proximate the second end 96 of the flow path 90 of the drying gas stream 20, as illustrated. In various embodiments, the pulse combustion dryer 30 may be configured to regulate the amount of additional gas flows such as the quench air 22 and the dilution air 24 admitted into the drying gas stream 20 to regulate the temperature of the drying gas stream 20 including the first temperature 104 and the second temperature 106. In various embodiments, the admission of fuel into the combustion chamber 32 may be controlled, the pulse rate of the pulse combustion dryer 30 may be regulated, and/or the pulse combustion dryer 30 may be configured and/or controlled in other ways to regulate the temperature of the drying gas stream 20 including the first temperature 104 and the second temperature 106, as would be recognized by those of ordinary skill in the art upon review of this disclosure. The temperature of the drying gas stream 20 including the first temperature 104 and the second temperature 106 may be adjusted, in various aspects, to produce the DDS biocomposite additive from the wet compounded biocomposite additive while not substantially denaturing proteins and/or oxidizing oils that may be present in the wet compounded biocomposite additive/DDS biocomposite additive.

The DDS biocomposite additive prepared by wet compounding or mixing followed by pulse combustion drying may have the following characteristics. The resulting particles may have a substantially uniform distribution of DDS biocomposite additive components and additives within the particles. The moisture content may range from about 0.5% to about 15%.

In other aspects the DDS biocomposite additive may be prepared by dry mixing or compounding, as illustrated in FIG. 1B. In this aspect, wet DDS biocomposite additive is dried to DDS biocomposite additive before additional materials are added and mixed. To add additional materials to the DDS, various methods for dry compounding can be used, and standard compounding equipment, including co-rotational and counter rotational twin screws, extruders, thermal kinetic compounders, high shear mixers, paddle mixers, static mixers blenders and the like may be used. In one aspect, the dry components are mixed together.

The DDS biocomposite additive may be in the form of, for example, pellets, particles granules, or powder. The powder obtained after drying the wet compounded biocomposite additive to the DDS biocomposite additive may be processed further, for example, into pellets using standard industrial pelletizing equipment, or may be processed, for example, into granules, using standard industrial granulation equipment.

In some embodiments, the DDS biocomposite additive may comprise separate components, such as DDS separate from other additives, so that the components are added separately to the plastic or thermoactive material.

In some aspects, the DDS biocomposite additive comprises dried distiller's solubles, a metal oxide, and a fiber. In some embodiments, the DDS biocomposite additive comprises dried distiller's solubles, a metal oxide, a fiber and latex. The latex may be any number of latex compounds, including, without limitation, latex, acrylic latex, acrylic latex compounds, including, without limitation styrenated acrylic latex. In some embodiments, the DDS biocomposite additive comprises dried distiller's solubles, a metal oxide, a fiber and white latex paint. White latex paint may include latex as well as a number of other components described above. The fiber may be a cellulose fiber or other fibers described above. The cellulose fiber may be paper mill sludge or fiber obtained from other paper recycling. In some embodiments, the DDS biocomposite also comprises a drying agent found in latex paint, including, without limitation, a metal oxide, such as zirconium oxide, copper oxide, cobalt oxide and/or iron oxide, and/or an ethylene oxide derivative or condensate. In some embodiments the DDS comprises about 0.01 wt-% to about 1 wt-% of an oxide drying agent.

In some aspects the DDS biocomposite additive comprises about 30 wt-% to about 90 wt-% dried distiller's solubles, about 2 wt-% to about 20 wt-% metal oxide, about 5 wt-% to about 50 wt-% fiber and about 1 wt-% to about 15 wt-% latex or a latex derivative or compound. In some embodiments, the dried distiller's solubles is obtained from a corn ethanol production facility. In some embodiments, the metal oxide is titanium oxide or zinc oxide, or a combination thereof. In other aspects, the DDS biocomposite additive comprises about 40 wt-% to about 80 wt-% dried distiller's solubles, about 3 wt-% to about 15 wt-% metal oxide, about 10 wt-% to about 40 wt-% fiber and about 2 wt-% to about 10 wt-% latex or a latex derivative or compound. In yet other aspects, the DDS biocomposite additive comprises about 50 wt-% to about 70 wt-% dried distiller's solubles, about 5 wt-% to about 10 wt-% metal oxide, about 15 wt-% to about 35 wt-% fiber and about 3 wt-% to about 7 wt-% latex or a latex derivative or compound. In even other aspects, the DDS biocomposite additive comprises about 55 wt-% to about 65 wt-% dried distiller's solubles, about 7 wt-% to about 9 wt-% metal oxide, about 20 wt-% to about 30 wt-% fiber and about 4 wt-% to about 6 wt-% latex or a latex derivative or compound. In some embodiments, the DDS is obtained from wet DDS biocomposite additive, which was produced in a corn ethanol production facility, the metal oxide is titanium dioxide, the fiber is cellulose fiber and the latex compound is latex or styrenated acrylic latex. In some embodiments, the cellulose fiber is obtained from paper mill sludge or from a paper recycling stream. In one embodiment, the DDS biocomposite additive comprises 61 wt-% dried distiller's solubles, 7 wt-% titanium dioxide, 25 wt-% cellulose and 7 wt-% latex paint solids. In another embodiment, the DDS biocomposite additive comprises 61 wt-% dried distillers solubles, 8 wt-% titanium dioxide, 25 wt-% cellulose and 5 wt-% latex, acrylic latex or styrenated acrylic latex.

In some aspects the invention provides a DDS biocomposite additive prepared by combining a mixture comprising about 30 wt-% to about 90 wt-% dried distiller's solubles, about 5 wt-% to about 20 wt-% metal oxide, and about 5 wt-% to about 50 wt-% fiber, drying the mixture in a pulsed drying gas stream. The pulsed gas stream may be generated by a pulse combustion dryer. The DDS biocomposite additive may also be prepared by the above method with the addition of from about 1 wt-% to about 15 wt-% latex, acrylic latex, or styrenated acrylic latex in the mixture.

In addition to the DDS biocomposite additive, the biopolymer of the present invention can include any of a wide variety of plastic and/or thermoactive materials. In some embodiments, the thermoactive and/or plastic material can be selected for its ability to form a homogeneous or largely homogeneous dough, including the DDS biocomposite additive. In some embodiments, the thermoactive and/or plastic material can be selected for its ability to covalently bond with the DDS biocomposite additive. In some or other embodiments, the thermoactive and/or plastic material can be selected for its ability to flow when mixed or compounded with the DDS biocomposite additive. In some or other embodiments, the thermoactive and/or plastic material can set after being formed. Numerous such thermoactive and/or plastic materials are commercially available.

Suitable thermoactive and/or plastic materials include thermoplastic, thermoset material, a resin and adhesive polymer, and the like. As used herein, the term "thermoplastic" refers to a plastic that can once hardened be melted and reset. As used herein, the term "thermoset" material refers to a material (e.g., plastic) that once hardened cannot readily be melted and reset. As used herein, the phrase "resin and adhesive polymer" refers to more reactive or more highly polar polymers than thermoplastic and thermoset materials.

Suitable thermoplastics include polyamide, polyolefin (e.g., polyethylene, polypropylene, poly(ethylene-copropylene), poly(ethylene-coalphaolefin), polybutene, polyvinyl chloride, acrylate, acetate, and the like, polystyrenes (e.g., polystyrene homopolymers, polystyrene copolymers, polystyrene terpolymers, and styrene acrylonitrile (SAN) polymers, polysulfone, halogenated polymers (e.g., polyvinyl chloride, polyvinylidene chloride, polycarbonate, and the like, copolymers and mixtures of these materials, and the like. Suitable vinyl polymers include those produced by homopolymerization, copolymerization, terpolymerization, and like methods. Suitable homopolymers include polyolefins such as polyethylene, polypropylene, poly-I-butene, and the like, polyvinylchloride, polyacrylate, substituted polyacrylate, polymethacrylate, polymethylmethacrylate, copolymers, mixtures of these materials, and the like. Suitable copolymers of alpha-olefins include ethylene-propylene copolymers, ethylene-hexylene copolymers, ethylene-methacrylate copolymers, ethylene-methacrylate copolymers, copolymers and mixtures of these materials, and the like. In certain embodiments, suitable thermoplastics include polypropylene (PP), polyethylene (PE), and polyvinyl chloride (PVC), copolymers and mixtures of these materials, and the like. In certain embodiments, suitable thermoplastics include polyethylene, polypropylene, polyvinyl chloride (PVC), low density polyethylene (LDPE), copoly-ethylenevinyl acetate, copolymers and mixtures of these materials, and the like.

Suitable thermoset materials include epoxy materials, melamine materials, copolymers and mixtures of these materials, and the like. In certain embodiments, suitable thermoset materials include epoxy materials and melamine materials. In certain embodiments, suitable thermoset materials include epichlorohydrin, bisphenol A, diglycidyl ether of 1,4-butanediol, diglycidyl ether of neopentyl glycol, diglycidyl ether of cyclohexanedimethanol, aliphatic; aromatic amine hardening agents, such as triethylenetetraamine, ethylenediamine, N-cocoalkyltrimethylenediamine, isophoronediamine, diethyltoluenediamine, tris(dimethylaminomethylphe-nol); carboxylic acid anhydrides such as methyltetrahydrophthalic anhydride, hexahydrophthalic anhydride, maleic anhydride, polyazelaic polyanhydride and phthalic anhydride, mixtures of these materials, and the like.

Suitable resin and adhesive polymer materials include resins such as condensation polymeric materials, vinyl polymeric materials, and alloys thereof. Suitable resin and adhesive polymer materials include polyesters (e.g., polyethylene terephthalate, polybutylene terephthalate, and the like), methyl diisocyanate (urethane or MDI), organic isocyanate, aromatic isocyanate, phenolic polymers, urea based polymers, copolymers and mixtures of these materials, and the like. Suitable resin materials include acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials, polycarbonate materials, chlorinated polyether resins, polyethersulfone resins, polyphenylene oxide resins, polysulfone resins, polyimide resins, thermoplastic urethane elastomers, copolymers and mixtures of these materials, and the like. In certain embodiments, suitable resin and adhesive polymer materials include polyester, methyl diisocyanate (urethane or MDI), phenolic polymers, urea based polymers, and the like.

Suitable thermoactive materials include polymers derived from renewable sources, such as polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e., BAK), a modified polyethylene terephthalate (PET) (i.e., BIOMAX), and "aliphatic-aromatic" copolymers (i.e, ECOFLEX and EASTAR BIO), mixtures of these materials and the like. The biopolymer can contain from about 1% to about 50% of polymers derived from renewable sources, such as PLA and PHAs.

Other suitable thermoactive materials include thermoplastic elastomers, such as thermoplastic polyurethanes, vulcanized thermoplastic polyolefins, thermoplastic vulcanizate, polyolefin elastomers, and the like. Suitable thermoplastic polyurethane can be or include an aromatic polyester based thermoplastic polyurethane. Such thermoplastic polyurethanes are commercially available under the tradenames TEXIN® (e.g., TEXIN® 185) or DESMOPAN® from Bayer. Suitable thermoplastic elastomers are known and commercially available from any of a variety of sources. Suitable thermoplastic elastomers include thermoplastic vulcanizate sold under the tradename SARLINK® and the thermoplastic vulcanizate sold under the tradename SANTOPRENE.

Suitable thermoactive materials include terephthalate polymers, such as poly(trimethylene terephthalate) and polybutylene terephthalate (PBT). These thermoactive materials can include, for example, monomeric units derived from dimethylterephthalate (DMT) and/or terephthalic acid (TPA) and also 1,3-propanediol or 1,4-butanediol. Suitable thermoactive materials include other diol derived polymers, for example, polyesters such as poly(butylene adipate) diols, which can be formulated into urethane elastomers.

Thermoactive materials, or thermoplastic materials can include mixtures of recycled plastics. Recycled plastics from a variety of sources may be used. For example, plastic may be obtained from plastic waste including, without limitation, grocery bags, agricultural films, plastic sheets, disposable cups, plates, containers, industrial scrap and municipal waste, including plastics recovered from household recycling programs, from plastic recycling centers and from various sectors of industry, and from waste electrical and electronic equipment. The recycled plastics can include, without limitation, homopolymers or copolymers of ethylene, polypropylene, vinyl chloride, styrene, acrylonitride, butadiene, acrylic acid, methacrylic acid, methylacrylate, methylmethylacrylate, acrylamide, carbonates, polybutylene, terephthalate, polyethylene naphthalate, cellulose acetate, cellulose acetate butryrate, polyacetal, poly(vinyl butyral)polyurethane and mixtures thereof. The plastics may be shredded, densified, granulated or regrind. In some embodiments, the recycled plastic has a meltable plastic portion of at least 50%.

In some embodiments, the biopolymer can include thermoactive or plastic material at about 0.01 to about 95 wt-%, about 1 to about 95 wt-%, about 5 to about 30 wt-%, about 5 to about 40 wt-%, about 5 to about 50 wt-%, about 5 to about 85 wt-%, about 5 to about 95 wt-%, about 10 to about 30 wt-%, about 10 to about 40 wt-%, about 10 to about 50 wt-%, or about 10 to about 95 wt-%. In certain embodiments, the biopolymer can include thermoactive material at about 95 wt-%, about 75 wt-%, about 50 wt-%, about 45 wt-%, about 40 wt-%, about 35 wt-%, about 30 wt-%, about 25 wt-%, about 20 wt-%, about 15 wt-%, about 10 wt-%, or about 5 wt-%. The present biopolymer can include any of these amounts or ranges not modified by about.

Thermoplastic, thermoset, resin and/or adhesive polymer materials may be compounded or mixed with the DDS biocomposite additive using any of a variety of methods. Other additives may also be compounded with the thermoplastic or thermoactive material and the DDS biocomposite additive.

Compounding can include heating the DDS biocomposite additive and the thermoplastic, thermoset, resin and/or adhesive polymer materials. Compounding can include extruding, high shear mixing and the like. The compounded biopolymer can be used directly or can be formed as pellets, granules or other convenient form for converting to articles by molding or other processes. Advantageously, the compounded DDS biocomposite additive and the thermoplastic, thermoset, resin and/or polymer adhesive material can be an integrated mass that is homogenous or nearly so.

The present biopolymer can be formed by any of a variety of extruding processes suitable for mixing or compounding the DDS biocomposite additive and the thermoplastic, thermoset, resin and/or polymer adhesive material. For example, conventional extruding processes, such as twin screw compounding, can be employed to make the present biopolymer. Compounding by extruding can provide a higher internal temperature within the extruder and promote the interaction of the thermoplastic, thermoset, resin and/or polymer adhesive material with the DDS biocomposite additive. Twin screw compounding can employ co- or counter-rotating screws. The extruder can include vents that allow escape of moisture or volatiles from the mixture being compounded. Using a die on the extruder can compound and form the biopolymer.

In some aspects the biopolymer includes about 60 wt-% to about 99.5 wt-% of a thermoplastic, thermoset, resin, polymer adhesive material, or mixtures thereof and about 0.5 wt-% to about 40 wt-% of the DDS biocomposite additive. In other embodiments, the biopolymer includes about 80 wt-% to about 99.5 wt-% of a thermoplastic, thermoset, resin, polymer adhesive material, or mixtures thereof and about 0.5 wt-% to about 20 wt-% of the DDS biocomposite additive. In even other embodiments, the biopolymer includes about 99, 98, 97, 96, 95, 94, 93, 92, 90, 88, 85, or 80 wt-% of a thermoplastic, thermoset, resin, polymer adhesive material, or mixtures thereof and about 1, 2, 3, 4, 5, 6, 7, 8, 10, 12, 15, or 20 wt-%, respectively, of the DDS biocomposite additive.

In some aspects, the biopolymer includes about 60 wt-% to about 99.5 wt-% of a thermoplastic, thermoset, resin, polymer adhesive material, or mixtures thereof; about 0.15 wt-% to about 35 wt-% of DDS, about 0.025 wt-% to about 8.0 wt-% of a metal oxide, and about 0.025 wt-% to about 8 wt-% of fiber. The metal oxide can be any of the metal oxides described above, and in some embodiments the metal oxide is titanium dioxide, zinc oxide or mixtures thereof. In some embodiments, the fiber is a cellulose fiber. In some embodiments the biopolymer includes about 80 wt-% to about 99.5 wt-% of a thermoplastic, thermoset, resin, polymer adhesive material, or mixtures thereof; about 0.15 wt-% to about 20 wt-% of DDS, about 0.025 wt-% to about 4.0 wt-% of a metal oxide, and about 0.025 wt-% to about 4 wt-% of fiber. In some embodiments the biopolymer also includes about 0.005 wt-% to about 6 wt-% latex, or latex compounds, including, without limitation, acrylic latex and/or styrenated acrylic latex. In some embodiments, the biopolymer includes about 99 wt-% of a thermoplastic, thermoset, resin, polymer adhesive material, or mixtures thereof; about 0.3 wt-% to about 0.9 wt-% of DDS, about 0.02 wt-% to about 0.2 wt-% of a metal oxide, about 0.05 wt-% to about 0.2 wt-% of fiber and about 0.01 wt-% to about 0.15 wt-% of latex, acrylic latex or styrenated acrylic latex. In other embodiments, the biopolymer includes about 95 wt-% of a thermoplastic, thermoset, resin, polymer adhesive material, or mixtures thereof; about 1.5 wt-% to about 4.5 wt-% of DDS, about 0.1 wt-% to about 1 wt-% of a metal oxide, about 0.25 wt-% to about 1 wt-% of fiber and about 0.05 wt-% to about 0.75 wt-% of latex, acrylic latex or styrenated acrylic latex. In other embodiments, the biopolymer includes about 95 wt-% of a thermoplastic, thermoset, resin, polymer adhesive material, or mixtures thereof; about 2 wt-% to about 4 wt-% of DDS, about 0.2 wt-% to about 0.6 wt-% of a metal oxide, about 0.5 wt-% to about 2 wt-% of fiber and about 0.2 wt-% to about 0.6 wt-% of latex, acrylic latex or styrenated acrylic latex. In other embodiments, the biopolymer includes about 90 wt-% of a thermoplastic, thermoset, resin, polymer adhesive material, or mixtures thereof; about 3 wt-% to about 9 wt-% of DDS, about 0.2 wt-% to about 2 wt-% of a metal oxide, about 0.5 wt-% to about 2 wt-% of fiber and about 0.1 wt-% to about 1.5 wt-% of latex, acrylic latex or styrenated acrylic latex. In other embodiments, the biopolymer includes about 90 wt-% of a thermoplastic, thermoset, resin, polymer adhesive material, or mixtures thereof; about 4 wt-% to about 6 wt-% of DDS, about 0.4 wt-% to about 1.2 wt-% of a metal oxide, about 1.0 wt-% to about 4 wt-% of fiber and about 0.2 wt-% to about 1 wt-% of latex, acrylic latex or styrenated acrylic latex. In other embodiments, the biopolymer includes about 80 wt-% of a thermoplastic, thermoset, resin, polymer adhesive material, or mixtures thereof; about 6 wt-% to about 18 wt-% of DDS, about 0.4 wt-% to about 4 wt-% of a metal oxide, about 1.0 wt-% to about 4 wt-% of fiber and about 0.2 wt-% to about 3 wt-% of latex, acrylic latex or styrenated acrylic latex. In other embodiments, the biopolymer includes about 80 wt-% of a thermoplastic, thermoset, resin, polymer adhesive material, or mixtures thereof; about 8 wt-% to about 12 wt-% of DDS, about 0. 8 wt-% to about 2.4 wt-% of a metal oxide, about 2 wt-% to about 8 wt-% of fiber and about 0.4 wt-% to about 2 wt-% of latex, acrylic latex or styrenated acrylic latex. In some embodiments the metal oxide includes titanium dioxide. In some embodiments the fiber includes cellulose fiber. In some embodiments, the thermoplastic is polyvinyl chloride, polyethylene, polypropylene, HDPE, LDPE, or mixtures thereof. In other embodiments the thermoplastic is recycled plastic, with a meltable portion of at least 50%. In some embodiments, the biopolymer also includes about 0.001 wt-% to about 1 wt-% of ethylene oxide derivatives.

The present biopolymer can be suitable for forming (e.g., by extruding or molding) into a myriad of forms and end products. For forming, the biopolymer can be in any of a variety of forms, such as particles, granules, or pellets. Articles, such as bars, sheet stock, or other formed articles can be produced from the present biopolymer through any of a variety of common, known manufacturing methods including extrusion molding, injection molding, blow molding, compression molding, transfer molding, thermoforming, casting, calendering, low-pressure molding, high-pressure laminating, reaction injection molding, foam molding, and coating. For example, the present biopolymer can be formed into articles by injection molding, extrusion, compression molding, other plastic molding processes, or with a robotically controlled extruder such as a mini-applicator. The present biopolymer including the DDS biocomposite additive can be used in, for example, paints, adhesives, coatings, powder coatings, plastics, polymer extenders, and the like.

The DDS biocomposite additive can be used in a variety of applications, including, without limitation, as a foaming agent, as an agent to lower the Tm or Tg of a thermoplastic, thermoset, resin and/or polymer adhesive material, and/or as a compatibilizing agent for mixtures of thermoplastic, thermoset, resin and/or polymer adhesive materials.

In one aspect the DDS biocomposite additive can act as a foaming agent. When added to a thermoplastic material, such as high density polyethylene, low density polyethylene, polypropylene, polystyrene, polycarbonate, ethylene vinylacetate, polylactic acid, polyhydroxyalkanoates, metallocene, polyvinyl chloride, and the like, the resulting biopolymer can be foamed, either from a soft form or upon melting, without addition of other foaming or blowing agents. The thermoplastic-DDS biocomposite additive can foam upon extruding, or when used in molding processes, including injection molding. In injection molding, the mold can be partially filled to allow the foaming action of the biopolymer to fill the cavity.

Without being bound by theory, it is thought that as the proteins in DDS are blended, heated, sheared and under pressure, they release carbon dioxide and/or nitrogen as the proteins uncoil and become more polar. The carbon dioxide and/or nitrogen becomes saturated within the molten polymer under pressure. When subjected to a pressure drop, the carbon dioxide comes out of solution to create microbubbles starting from nucleating sites of the micro- or nano-fiber or protein particles.

In some aspects, the resulting foamed biopolymer has an interior foamed material and a non-foam shell.

The DDS biocomposite additive when used as a foaming agent has a number of advantages, including, reduction in the amount of thermoplastic material needed through component density reduction, thinner design and material substitution, reduced equipment costs through the purchase of smaller and fewer machines, and fewer and less expensive molds, reduced operating costs through cycle time reductions of up to 50%, reduced scrap rates and lower energy consumption, and the ability to mold thermoplastic parts that are flatter, straighter and dimensionally improved. In some embodiments, the amount of thermoplastic materials used is reduced from about 20% to about 50%. In one embodiment, the amount of thermoplastic materials used is reduced about 30%.

The present invention also includes a foamed biopolymer composition prepared by combining a mixture comprising about 80 wt-% to about 99.5 wt-% of a thermoplastic material, about 0.15 wt-% to about 10 wt-% of DDS, about 0.025 wt-% to about 4.0 wt-% of a metal oxide; and about 0.025 wt-% to about 10 wt-% of fiber; and forming the foamed composition by extruding or molding the mixture. The mixture may further comprise about 0.005 wt-% to about 6 wt-% latex, acrylic latex, other latex compound or mixtures thereof. In other embodiments, the mixture may also comprise about 0.001 wt-% to about 1 wt-% of ethylene oxide derivatives. In some embodiments, the thermoplastic material is HDPE, and in other embodiments the thermoplastic material is a combination of HDPE and polypropylene.

The DDS biocomposite additive can also act to lower the melting and extrusion temperatures of thermoplastic, thermoset, resin and/or polymer adhesive materials and mixtures thereof. In some aspects, a biopolymer composition comprising one or more thermoplastic materials and the DDS biocomposite additive can be processed at a temperature of about 10 to about 35% below the processing temperature without the addition of the DDS biocomposite additive. Such a biopolymer comprises about 80 wt-% to about 99.5 wt-% of a thermoplastic, thermoset, resin, polymer adhesive material, or mixtures thereof; about 0.15 wt-% to about 10 wt-% of DDS, about 0.025 wt-% to about 4.0 wt-% of a metal oxide, and about 0.025 wt-% to about 10 wt-% of fiber.

The present invention also provides a biopolymer composition prepared by combining a mixture comprising about 80 wt-% to about 99.5 wt-% of a thermoplastic, or thermoplastic mixture, about 0.15 wt-% to about 10 wt-% of DDS, about 0.025 wt-% to about 4.0 wt-% of a metal oxide and about 0.025 wt-% to about 10 wt-% of fiber; and processing the mixture at a temperature about 10% to about 35% below the processing temperature of the thermoplastic alone or thermoplastic mixture alone. The mixture may further comprise about 0.005 wt-% to about 6 wt-% latex, acrylic latex, other latex compound or mixtures thereof. In other embodiments, the mixture may also comprise about 0.001 wt-% to about 1 wt-% of ethylene oxide derivatives.

The DDS biocomposite additive may also act as a compatibilizing additive for incompatible plastics, including post consumer comingled recycled plastic. The mixed plastics can include a mixture of thermoplastic materials. In some aspects, the addition of a DDS biocomposite additive to a mixture of incompatible thermoplastics allows the incompatible thermoplastic constituents of the mixture to combine into a single homogeneous mass. The recycled plastics can include a number of thermoplastic materials, including, without limitation, styrene, olefins, polyvinyl chloride, and other thermoplastics. When incompatible plastics are mixed, and processed through an extruder, the resulting material is not homogeneous, and contains unmixed sections and discontinuities. In some embodiments, a biocomposite mixture includes about 80 wt % to about 99 wt % of the thermoplastic mixture, and about 1 wt % to about 20 wt % of the DDS biocomposite additive. When this biocomposite mixture is processed using an extruder, the extruded material becomes homogeneous.

The present invention also provides a biopolymer composition prepared by combining a mixture comprising about 80 wt-% to about 99.5 wt-% of a mixture of incompatible thermoplastic materials, about 0.15 wt-% to about 10 wt-% of DDS, about 0.025 wt-% to about 4.0 wt-% of a metal oxide; and about 0.025 wt-% to about 10 wt-% of fiber; and forming the homogeneous thermoplastic composition by extruding the mixture. The mixture may further comprise about 0.005 wt-% to about 6 wt-% latex, acrylic latex, other latex compound or mixtures thereof. In other embodiments, the mixture may also comprise about 0.00 wt-% to about 1 wt-% of ethylene oxide derivatives. The incompatible thermoplastics can include any of a number of recycled plastics obtained from different sources. In some embodiments, the recycled plastic mixture includes at least 50% meltable plastic.

The present invention also provides a method of recycling mixed thermoplastics by combining a mixture comprising about 80 wt-% to about 99.5 wt-% of a mixture of incompatible thermoplastic materials, about 0.15 wt-% to about 10 wt-% of DDS, about 0.025 wt-% to about 4.0 wt-% of a metal oxide; and about 0.025 wt-% to about 10 wt-% of fiber; and forming the homogeneous thermoplastic composition by extruding or molding the mixture. The mixture may further comprise about 0.005 wt-% to about 6 wt-% latex, acrylic latex, other latex compound or mixtures thereof. In other embodiments, the mixture may also comprise about 0.001 wt-% to about 1 wt-% of ethylene oxide derivatives. The incompatible thermoplastics can include any of a number of recycled plastics obtained from different sources. In some embodiments, the recycled plastic mixture includes at least 50% meltable plastic.

EXAMPLES

A further understanding may be obtained by reference to certain specific examples, which are provided herein for the purpose of illustration only and are not intended to be limiting unless otherwise specified.

Example 1

Production of DDS Biocomposite Thermoplastic by Pulse Combustion Drying Condensed Distiller's Solubles with Additives Condensed distiller's solubles (CDS) was obtained from an operating corn ethanol facility. The measured solids concentration in the material was 32% and it had the appearance of a thick viscous liquid. The liquid was combined with cellulose fibers obtained from a paper recycling stream, industrial grade titanium dioxide, and white latex paint. After drying, the mixing formula of ingredients was 61% dry weight DDS, 25% cellulose fiber, 7% titanium dioxide, and 7% white latex paint solids.

This liquid mixture was introduced into a P-1 Pulse Combustion Drier (Pulse Combustion Systems, Payson, Ariz.) using an impeller pump. The drier was operated at 800,000 Btu per hour heat release and an exit temperature of 180° F. The liquid mixture dried into a light tan powder with residual moisture content of less than 5%. This powder is one formulation of DDS biocomposite additive. It can be used either as the powder or processed further into pellets using standard industrial pelletizing equipment, or granules, using standard industrial granulation equipment.

Example 2

DDS Biocomposite Additive Used as a Compatiblizing Additive with Post Consumer Comingled Recycled Plastic A supply of post consumer comingled recycled plastic (PCCRP) was obtained from a plastics recycling line. The materials were estimated to contain approximately 50% styrene mixed with olefins, PVC and other unknown plastics that occur in the stream. The recommended processing temperature for extrusion of this thermoplastic mix was 450° F.

A single screw thermoplastic extruder with a 2 inch barrel was used to conduct trial extrusions through a rectangular die into a water cooling bath and out of the bath through a puller used to keep the extruded material taut. The extruder was preheated to 450° F. and PCCRC with no addition was loaded into the feed hopper. The material emerged from the die in strings with obvious unmixed sections and discontinuities. PCCRC with a 5% addition of the DDS Biocomposite Additive, as described in Example 1, was fed into the extruder. The material emerged intact with a homogenous appearance. The addition of the DDS biocomposite additive, as described in Example 1, allowed the incompatible thermoplastic constituents of the mixture to combine into a single homogeneous mass.

Example 3

Reduction in Processing Temperatures by Addition of a DDS Biocomposite Additive to Thermoplastic Resins In Example 2 the recommended processing temperature of the PCCRC was 450° F. The PCCRC was mixed with 5% by weight DDS biocomposite additive as described in Example 1, and loaded into the feed hopper of the extruder. As the material was being extruded the temperature was ramped down in 50° F. increments and allowed to stabilize at each step. The extrusion energy was monitored by the amp draw of the drive motor and the quality of the extrusion was monitored by inspection.

The temperature was reduced to 400° F., 350° F. and 300° F. For the first two increments there was no measured increase in amp draw. The extrusion rate and quality of the extrusion product did not change. At 300° F. the amp draw increased approximately 15%. The extrusion product began to show inclusions of material that had not melted and combined homogeneously with the other materials.

The addition of 5% DDS biocomposite additive, as described in Example 1, to the PCCRC material allowed the processing temperature to be reduced at least 100° F. below the recommended processing temperature with no measurable effect on the extruder energy requirement or visible effect on the quality of the extrusion product.

Example 4

Reduction of Material Required for a Part by Addition of a DDS Biocomposite Additive to Produce Foam 11 melt high density polyethylene (HDPE) was used to create 47 inch test disks by injection molding using a 375 ton, multi-nozzle, low pressure structural foam molding machine that was fully hydraulic with a 4.5 inch extruder.

The first test disks were made using only native HDPE with no foaming agent or other additives. The native HDPE disk weight was 30.4 lbs. The second test disks were made using a mixture of HDPE and 5% DDS biocomposite additive, as described in Example 1. The weight of the second test disk was 22.0 lbs.

The use of 5% DDS biocomposite additive, as described in Example 1, with HDPE in injection molding reduced the material requirement for the part by approximately 28%. The excess material was displaced by gas bubbles produced by the DDS biocomposite additive, as described in Example 1, during processing.

The foregoing discussion discloses and describes merely exemplary embodiments. Upon review of the specification, one of ordinary skill in the art will readily recognize from such discussion, and from the accompanying figures and claims, that various changes, modifications and variations can be made therein without departing from the spirit and scope of the invention as defined in the following claims.

What is claimed is:

1. A method of making a foamed composition comprising:
   combining a mixture comprising: about 80 wt-% to about 99.5 wt-% of a thermoplastic material; about 0.15 wt-% to about 10 wt-% of dried distillers with solubles (DDS); about 0.025 wt-% to about 4.0 wt-% of a metal oxide; and about 0.025 wt-% to about 10 wt-% of fiber; and forming the foamed composition by extruding or molding the mixture.

2. A method for processing an incompatible thermoplastic mixture into a homogeneous thermoplastic composition comprising:
   combining a mixture comprising: about 80 wt-% to about 99.5 wt-% of a mixture of incompatible thermoplastic materials; about 0.15 wt-% to about 10 wt-% of dried distillers with solubles (DDS); about 0.025 wt-% to about 4.0 wt-% of a metal oxide; and
   about 0.025 wt-% to about 10 wt-% of fiber; and forming the homogeneous thermoplastic composition by extruding the mixture.

3. The method of claim 1, wherein molding the mixture comprises partially filling a mold with the mixture to form the foamed composition without adding foaming or blowing agents.

4. The method of claim 1, wherein the mixture further comprises about 0.005 wt-% to about 6 wt-% latex.

5. The method of claim 1, wherein the mixture further comprises about 0.001 wt-% to about 1 wt-% ethylene oxide derivatives.

6. The method of claim 2, wherein the mixture further comprises about 0.005 wt-% to about 6 wt-% latex.

7. The method of claim 2, wherein the mixture further comprises about 0.001 wt-% to about 1 wt-% ethylene oxide derivatives.

* * * * *